United States Patent
K N et al.

(10) Patent No.: US 12,081,336 B2
(45) Date of Patent: Sep. 3, 2024

(54) PACKET DROP MONITORING IN A VIRTUAL ROUTER

(71) Applicant: Juniper Networks, Inc., Sunnyvale, CA (US)

(72) Inventors: Kiran K N, Bangalore (IN); Yashika Badaya, Mumbai (IN); Rakesh Kumar Reddy Varimalla, Bengaluru (IN)

(73) Assignee: JUNIPER NETWORKS, INC., Sunnyvale, CA (US)

( * ) Notice: Subject to any disclaimer, the term of this patent is extended or adjusted under 35 U.S.C. 154(b) by 68 days.

(21) Appl. No.: 17/644,966

(22) Filed: Dec. 17, 2021

(65) Prior Publication Data

US 2023/0198676 A1    Jun. 22, 2023

(51) Int. Cl.
*H04L 1/1809* (2023.01)
*H04L 12/46* (2006.01)
*H04L 43/0829* (2022.01)
*H04L 45/00* (2022.01)
(Continued)

(52) U.S. Cl.
CPC ........ *H04L 1/1809* (2013.01); *H04L 12/4633* (2013.01); *H04L 43/0829* (2013.01); *H04L 45/22* (2013.01); *H04L 45/28* (2013.01); *H04L 45/586* (2013.01)

(58) Field of Classification Search
CPC .............. H04L 1/1809; H04L 11/4633; H04L 43/0829; H04L 45/22; H04L 45/28; H04L 45/586; H04L 12/4633
See application file for complete search history.

(56) References Cited

U.S. PATENT DOCUMENTS

| | | |
|---|---|---|
| 9,356,866 B1 | 5/2016 | Sivaramakrishnan et al. |
| 9,571,394 B1 | 2/2017 | Sivaramakrishnan et al. |
| 10,735,282 B1 | 8/2020 | Singh et al. |

(Continued)

FOREIGN PATENT DOCUMENTS

| | | |
|---|---|---|
| EP | 3419221 A1 | 12/2018 |
| EP | 3576356 A1 | 12/2019 |
| WO | 2013/184846 A1 | 12/2013 |

OTHER PUBLICATIONS

Extended Search Report from counterpart European Application No. 22213980.0 dated Apr. 24, 2023, 11 pp.

(Continued)

*Primary Examiner* — Jianye Wu
(74) *Attorney, Agent, or Firm* — Shumaker & Sieffert, P.A.

(57) ABSTRACT

Techniques are described for capturing dropped packets and creating modified dropped packets with drop information associated with the dropped packets to provide greater details of the dropped packets for further analysis and/or serviceability. For example, a computing device comprises an internal communication channel, a process executing in user space, and a virtual router. The virtual router comprises, for example, processing circuitry and a drop interface to the internal communication channel, wherein the virtual router is configured to: receive a packet; in response to determining the packet is to be dropped, creating a modified dropped packet to include drop information associated with the packet; and provide the modified dropped packet to the drop interface to communicate the modified dropped packet via the internal communication channel to the process.

18 Claims, 4 Drawing Sheets

(51) Int. Cl.
 *H04L 45/28* (2022.01)
 *H04L 45/586* (2022.01)

(56) References Cited

U.S. PATENT DOCUMENTS

| | | | | |
|---|---|---|---|---|
| 11,743,135 | B2* | 8/2023 | Mordani | G06F 16/215 |
| | | | | 715/736 |
| 2009/0028172 | A1* | 1/2009 | Scott | H04L 45/28 |
| | | | | 370/419 |
| 2011/0149991 | A1* | 6/2011 | Jiang | H04L 47/10 |
| | | | | 370/429 |
| 2012/0020220 | A1* | 1/2012 | Sugita | H04L 63/02 |
| | | | | 370/235 |
| 2019/0273683 | A1* | 9/2019 | Jiang | G06F 9/45558 |

OTHER PUBLICATIONS

Munukutla et al., "IP Flow Information Export (IPFIX) Information Elements Extension for Forwarding Exceptions", IETF Trust, Feb. 4, 2021, 13 pp.

Response to Extended Search Report dated Apr. 24, 2023, from counterpart European Application No. 22213980.0 filed Dec. 20, 2023, 35 pp.

Mackie et al., "BGP-Signaled End-System IP/VPNs," draft-ietf-l3vpn-end-system-06, Dec. 15, 2016, 31 pp.

IN Provisional Application No. 202141008464, "DPDK VNF Acceleration Using Vrouter DPDK in Contrail Kubernetes," Juniper Networks, Inc. (inventor: Sharma) filed Mar. 1, 2021.

\* cited by examiner

PACKET DROP MONITORING IN A VIRTUAL ROUTER

TECHNICAL FIELD

The disclosure relates to a computing networks and, more specifically, to monitoring dropped packets within computer networks.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center.

The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities. In some examples, the infrastructure of a cloud data center may include a combination of physical devices, which may be referred to as the "underlay resources," that are linked to and communicate with a variety of virtual resources such as virtual servers, agents, and/or policy controllers, which may be referred to as "overlay resources."

The various network devices included in the network fabric typically include mechanisms, such as management interfaces, for locally or remotely configuring these devices. By interacting with the management interface of the network devices, an administrator or other user can perform configuration tasks to configure the devices, and the user can also perform operational commands on the devices to manage, collect, and/or view operational data of the devices. For example, the user may configure interface cards of the device, adjust parameters for supported network protocols, specify physical components within the device, modify routing information maintained by a router, access software modules and other resources residing on the device, and/or perform other configuration tasks. In addition, the user may also provide commands to view current operating parameters, system logs, information related to network connectivity, network activity, or other status information from the devices, as well as view and react to event information received from the devices.

SUMMARY

In general, techniques are described for capturing dropped packets and creating modified dropped packets with drop information associated with the dropped packets to provide greater details of the dropped packets for further analysis and/or serviceability. For example, computing devices (alternatively referred to as a "compute nodes" or "servers") may provide forwarding plane in the form of virtual routers that extend the network from physical routers and switches in a data center switch fabric into a virtual overlay network hosted in the computing devices. Virtual routers dynamically create and manage one or more virtual networks usable for communication between application instances running on a virtualized execution element, such as a virtual machine or container. In accordance with the techniques described in this disclosure, a virtual router is configured to capture a dropped packet and to create a modified dropped packet to include drop information associated with the dropped packet, which is then provided to an interface configured in the virtual router that communicates the modified dropped packet to a process, such as a packet analyzer tool.

In one example, a virtual router is configured to receive a packet and in response to determining the packet is to be dropped (referred to herein as a "dropped packet"), the virtual router is configured to create a modified dropped packet to include drop information associated with the packet. For example, the virtual router is configured to encapsulate the modified dropped packet with information including one or more attributes of the dropped packet (e.g., drop type, when and where the drop occurred) and context specific information associated with the dropped packet (e.g., route information, table lookup information, etc.). In some examples, the virtual router is also configured with an interface (referred to herein as a "drop interface") to an internal communication channel of the computing device to communicate the modified dropped packet via the internal communication channel to a process (e.g., packet analyzer tool) to enable a user or administrator to further analyze the drop information associated with the packet.

The techniques may provide one or more technical advantages. For example, the techniques described herein provide an administrator or user with greater detail associated with the dropped packet occurring in a data plane rather than using logs that provide minimal information (e.g., count of dropped packets). Moreover, the techniques described herein may enable monitoring of dropped packets during a live network rather needing to recreate the dropped packet for debugging purposes, which may be difficult to recreate and is unable to troubleshoot the cause of the dropped packet in a timely manner.

In another example, a method includes receiving, by a virtual router of a computing device, a packet; in response to determining the packet is to be dropped, creating a modified dropped packet to include drop information associated with the packet; and providing, by the virtual router, the modified dropped packet to a drop interface of the virtual router to an internal communication channel of the computing device to communicate the modified dropped packet via the internal communication channel to a process executing in user space of the computing device.

In another example, a non-transitory computer-readable storage medium encoded with instructions that, when executed, cause one or more processors of a computing device to: receive a packet; in response to determining the packet is to be dropped, create a modified dropped packet to include drop information associated with the packet; and provide the modified dropped packet to a drop interface of a virtual router to an internal communication channel of the computing device to communicate the modified dropped packet to a process executing in a user space of the computing device.

The details of one or more examples of this disclosure are set forth in the accompanying drawings and the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Figure 1:
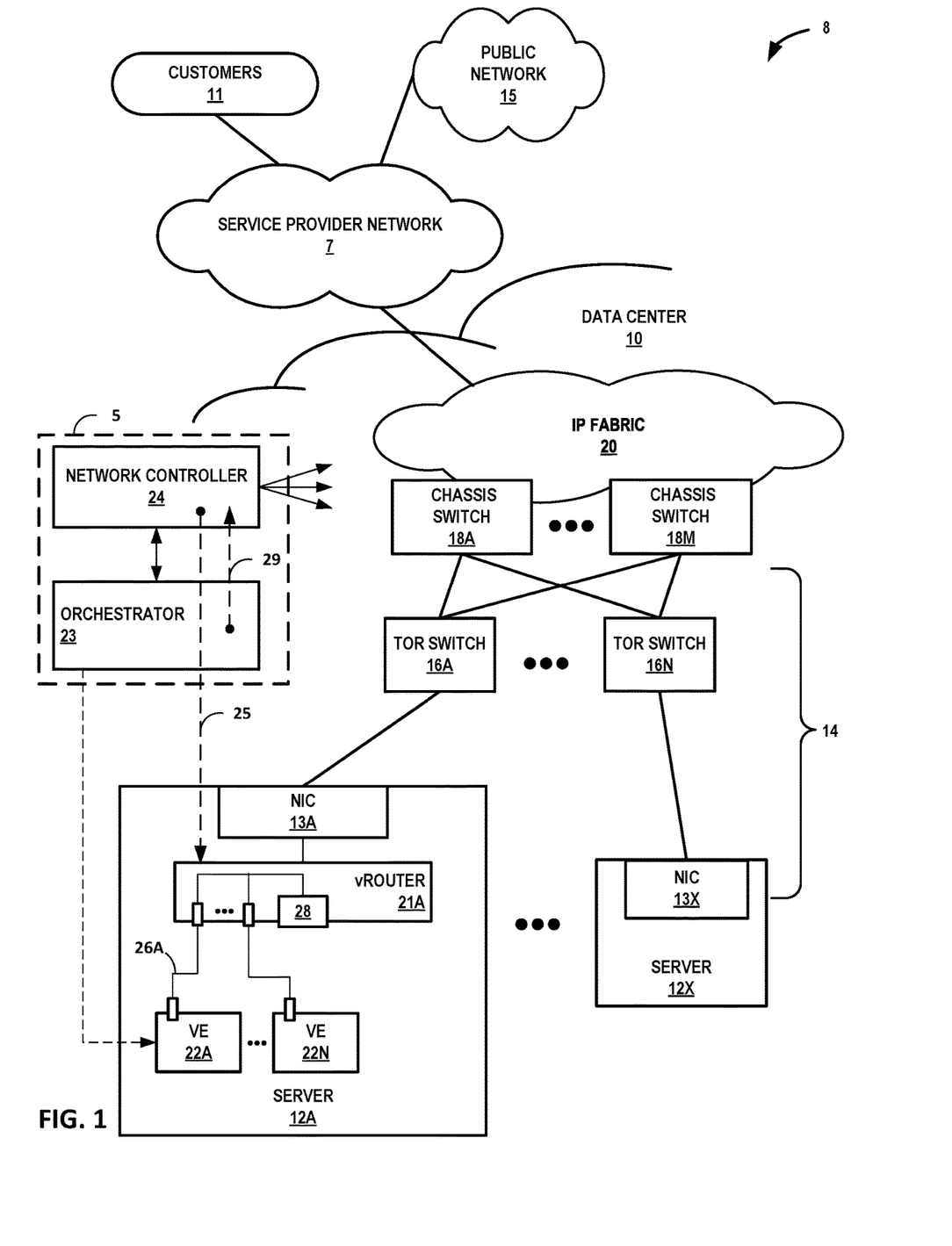
FIG. 1 is a block diagram illustrating an example computing infrastructure in which examples of the techniques described herein may be implemented.

FIG. 1 is a block diagram illustrating an example computing infrastructure 8 in which examples of the techniques described herein may be implemented. In general, data center 10 provides an operating environment for applications and services for a customer sites 11 (illustrated as "customers 11") having one or more customer networks coupled to the data center by service provider network 7. Data center 10 may, for example, host infrastructure equipment, such as networking and storage systems, redundant power supplies, and environmental controls. Service provider network 7 is coupled to public network 15, which may represent one or more networks administered by other providers, and may thus form part of a large-scale public network infrastructure, e.g., the Internet. Public network 15 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 15 are illustrated and described primarily as edge networks of service provider network 7, in some examples, one or more of customer sites 11 or public network 15 may be tenant networks within data center 10 or another data center. For example, data center 10 may host multiple tenants (customers) each associated with one or more virtual private networks (VPNs), each of which may implement one of customer sites 11.

Service provider network 7 offers packet-based connectivity to attached customer sites 11, data center 10, and public network 15. Service provider network 7 may represent a network that is owned and operated by a service provider to interconnect a plurality of networks. Service provider network 7 may implement, for example, Multi-Protocol Label Switching (MPLS) forwarding and in such instances may be referred to as an MPLS network or MPLS backbone. In some instances, service provider network 7 represents a plurality of interconnected autonomous systems, such as the Internet, that offers services from one or more service providers.

In some examples, data center 10 may represent one of many geographically distributed network data centers. As illustrated in the example of FIG. 1, data center 10 may be a facility that provides network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or supercomputing, and so on. Although illustrated as a separate edge network of service provider network 7, elements of data center 10 such as one or more physical network functions (PNFs) or virtualized network functions (VNFs) may be included within the service provider network 7 core.

In this example, data center 10 includes storage and/or compute devices (or "nodes"), e.g., servers 12A-12X (collectively, "servers 12"), interconnected via switch fabric 14 provided by one or more tiers of physical network switches and routers, with servers 12 depicted as coupled to top-of-rack switches 16A-16N. Servers 12 are computing devices and may also be referred to herein as "hosts" or "host devices." Although only server 12A coupled to TOR switch 16A is shown in detail in FIG. 1, data center 10 may include many additional servers coupled to TOR switches 16 of the data center 10.

Switch fabric 14 in the illustrated example includes interconnected top-of-rack (TOR) (or other "leaf") switches 16A-16N (collectively, "TOR switches 16") coupled to a distribution layer of chassis (or "spine" or "core") switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 10 may also include one or more physical network functions (PNFs) such as physical firewalls, load balancers, routers, route reflectors, broadband network gateways (BNGs), Evolved Packet Cores or other cellular network elements, and other PNFs.

In this example, TOR switches 16 and chassis switches 18 provide servers 12 with redundant (multi-homed) connectivity to IP fabric 20 and service provider network 7. Chassis switches 18 aggregate traffic flows and provides connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory and can execute one or more software processes. Chassis switches 18 are coupled to IP fabric 20, which may perform layer 3 routing to route network traffic between data center 10 and customer sites 11 by service provider network 7. The switching architecture of data center 10 is merely an example. Other switching architectures may have more or fewer switching layers, for instance.

Servers 12 may each represent a compute server or storage server. For example, each of servers 12 may represent a computing device, such as an x86 processor-based server, configured to operate according to techniques described herein. Servers 12 may provide Network Function Virtualization Infrastructure (NFVI) for an NFV architecture.

Any server of servers 12 may be configured with virtual execution elements by virtualizing resources of the server to provide an isolation among one or more processes (applications) executing on the server. "Hypervisor-based" or "hardware-level" or "platform" virtualization refers to the creation of virtual machines that each includes a guest operating system for executing one or more processes. In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

Virtual networks are logical constructs implemented on top of the physical networks. Virtual networks may be used to replace VLAN-based isolation and provide multi-tenancy in a virtualized data center, e.g., data center 10. Each tenant or an application can have one or more virtual networks. Each virtual network may be isolated from all the other virtual networks unless explicitly allowed by security policy.

Virtual networks can be connected to, and extended across physical Multi-Protocol Label Switching (MPLS) Layer 3 Virtual Private Networks (L3VPNs) and Ethernet Virtual Private Networks (EVPNs) networks using a datacenter 10 edge router (not shown in FIG. 1). Virtual networks may also used to implement Network Function Virtualization (NFV) and service chaining.

Virtual networks can be implemented using a variety of mechanisms. For example, each virtual network could be implemented as a Virtual Local Area Network (VLAN), Virtual Private Networks (VPN), etc. A virtual network can also be implemented using two networks—the physical underlay network made up of IP fabric 20 and switching fabric 14 and a virtual overlay network. The role of the physical underlay network is to provide an "IP fabric," which provides unicast IP connectivity from any physical device (server, storage device, router, or switch) to any other physical device. The underlay network may provide uniform low-latency, non-blocking, high-bandwidth connectivity from any point in the network to any other point in the network.

As described further below with respect to virtual router 21A, virtual routers running in the virtualized servers 12 create a virtual overlay network on top of the physical underlay network using a mesh of dynamic "tunnels" amongst themselves. These overlay tunnels can be MPLS over GRE/UDP tunnels, or VXLAN tunnels, or NVGRE tunnels, for instance. The underlay physical routers and switches may not contain any per-tenant state for virtual machines or other virtual execution elements, such as any Media Access Control (MAC) addresses, IP address, or policies. The forwarding tables of the underlay physical routers and switches may, for example, only contain the IP prefixes or MAC addresses of the physical servers 12. (Gateway routers or switches that connect a virtual network to a physical network are an exception and may contain tenant MAC or IP addresses.)

Virtual routers 21 of servers 12 often contain per-tenant state. For example, they may contain a separate forwarding table (a routing-instance) per virtual network. That forwarding table contains the IP prefixes (in the case of a layer 3 overlays) or the MAC addresses (in the case of layer 2 overlays) of the virtual machines or other virtual execution elements (e.g., pods of containers). No single virtual router 21 needs to contain all IP prefixes or all MAC addresses for all virtual machines in the entire data center. A given virtual router 21 only needs to contain those routing instances that are locally present on the server 12 (i.e. which have at least one virtual execution element present on the server 12.)

The control plane protocol between the control plane nodes of the network controller 24 or a physical gateway router (or switch) may be BGP (and may be Netconf for management). This is the same control plane protocol may also be used for MPLS L3VPNs and MPLS EVPNs. The protocol between the network controller 24 and the virtual routers 21 may be based on XMPP, for instance. The schema of the messages exchanged over XMPP may accord with Mackie et. al, "BGP-Signaled End-System IP/VPNs," draft-ietf-l3vpn-end-system-06, Dec. 15, 2016, which is incorporated by reference herein in its entirety.

In some example, servers 12 may implement "container-based" or "operating system" virtualization. "Container-based" or "operating system" virtualization refers to the virtualization of an operating system to run multiple isolated systems on a single machine (virtual or physical). Such isolated systems represent containers, such as those provided by the open-source DOCKER Container application or by CoreOS Rkt ("Rocket"). Like a virtual machine, each container is virtualized and may remain isolated from the host machine and other containers. However, unlike a virtual machine, each container may omit an individual operating system and provide only an application suite and application-specific libraries. In general, a container is executed by the host machine as an isolated user-space instance and may share an operating system and common libraries with other containers executing on the host machine. Thus, containers may require less processing power, storage, and network resources than virtual machines. A group of one or more containers may be configured to share one or more virtual network interfaces for communicating on corresponding virtual networks.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems. In some examples, containers may be deployed according to Linux Containers (LXC), an operating-system-level virtualization method for running multiple isolated Linux systems (containers) on a control host using a single Linux kernel.

Servers 12 host virtual network endpoints for one or more virtual networks that operate over the physical network represented here by IP fabric 20 and switch fabric 14. Although described primarily with respect to a data center-based switching network, other physical networks, such as service provider network 7, may underlay the one or more virtual networks.

Each of servers 12 may host one or more virtual execution elements each having at least one virtual network endpoint for one or more virtual networks configured in the physical network. A virtual network endpoint for a virtual network may represent one or more virtual execution elements that share a virtual network interface for the virtual network. For example, a virtual network endpoint may be a virtual machine, a set of one or more containers (e.g., a pod), or another other virtual execution element(s), such as a layer 3 endpoint for a virtual network. The term "virtual execution element" encompasses virtual machines, containers, and other virtualized computing resources that provide an at least partially independent execution environment for applications. The term "virtual execution element" may also encompass a pod of one or more containers. As shown in FIG. 1, server 12A hosts virtual network endpoints in the form of virtual execution elements 22A-22N (collectively, "VEs 22"). A server 12 may execute as many virtual execution elements as is practical given hardware resource limitations of the server 12. Each of the virtual network endpoints may use one or more virtual network interfaces to perform packet I/O or otherwise process a packet. For example, a virtual network endpoint may use one virtual hardware component (e.g., an SR-IOV virtual function) enabled by NIC 13A to perform packet I/O and receive/send packets on one or more communication links with TOR switch 16A. Other examples of virtual network interfaces are described below.

Servers 12 each includes at least one network interface card (NIC) 13, which each includes at least one interface to exchange packets with TOR switches 16 over a communication link. For example, server 12A includes NIC 13A. Any of NICs 13 may provide one or more virtual hardware components for virtualized input/output (I/O). A virtual hardware component for I/O maybe a virtualization of a physical NIC 13 (the "physical function"). For example, in Single Root I/O Virtualization (SR-IOV), which is described in the Peripheral Component Interface Special Interest Group SR-IOV specification, the PCIe Physical Function of the network interface card (or "network adapter") is virtualized to present one or more virtual network interfaces as "virtual functions" for use by respective endpoints executing on the server 12. In this way, the virtual network endpoints may share the same PCIe physical hardware resources and the virtual functions are examples of virtual hardware components. As another example, one or more servers 12 may implement Virtio, a para-virtualization framework available, e.g., for the Linux Operating System, that provides emulated NIC functionality as a type of virtual hardware component to provide virtual network interfaces to virtual network endpoints. As another example, one or more servers 12 may implement Open vSwitch to perform distributed virtual multilayer switching between one or more virtual NICs (vNICs) for hosted virtual machines, where such vNICs may also represent a type of virtual hardware component that provide virtual network interfaces to virtual network endpoints. In some instances, the virtual hardware components are virtual I/O (e.g., NIC) components. In some instances, the virtual hardware components are SR-IOV virtual functions. In some examples, any server of servers 12 may implement a Linux bridge that emulates a hardware bridge and forwards packets among virtual network interfaces of the server or between a virtual network interface of the server and a physical network interface of the server. For Docker implementations of containers hosted by a server, a Linux bridge or other operating system bridge, executing on the server, that switches packets among containers may be referred to as a "Docker bridge." The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12.

Any of NICs 13 may include an internal device switch to switch data between virtual hardware components associated with the NIC. For example, for an SR-IOV-capable NIC, the internal device switch may be a Virtual Ethernet Bridge (VEB) to switch between the SR-IOV virtual functions and, correspondingly, between endpoints configured to use the SR-IOV virtual functions, where each endpoint may include a guest operating system. Internal device switches may be alternatively referred to as NIC switches or, for SR-IOV implementations, SR-IOV NIC switches. Virtual hardware components associated with NIC 13A may be associated with a layer 2 destination address, which may be assigned by the NIC 13A or a software process responsible for configuring NIC 13A. The physical hardware component (or "physical function" for SR-IOV implementations) is also associated with a layer 2 destination address.

To switch data between virtual hardware components associated with NIC 13A, internal device switch may perform layer 2 forwarding to switch or bridge layer 2 packets between virtual hardware components and the physical hardware component for NIC 13A. Each virtual hardware component may be located on a virtual local area network (VLAN) for the virtual network for the virtual network endpoint that uses the virtual hardware component for I/O.

One or more of servers 12 may each include a virtual router 21 that executes one or more routing instances for corresponding virtual networks within data center 10 to provide virtual network interfaces and route packets among the virtual network endpoints. Each of the routing instances may be associated with a network forwarding table. Each of the routing instances may represent a virtual routing and forwarding instance (VRF) for an Internet Protocol-Virtual Private Network (IP-VPN). Packets received by the virtual router 21A (illustrated as "vROUTER 21A") of server 12A, for instance, from the underlying physical network fabric of data center 10 (i.e., IP fabric 20 and switch fabric 14) may include an outer header to allow the physical network fabric to tunnel the payload or "inner packet" to a physical network address for a network interface card 13A of server 12A that executes the virtual router. The outer header may include not only the physical network address of the network interface card 13A of the server but also a virtual network identifier such as a VxLAN tag or Multiprotocol Label Switching (MPLS) label that identifies one of the virtual networks as well as the corresponding routing instance executed by the virtual router 21A. An inner packet includes an inner header having a destination network address that conforms to the virtual network addressing space for the virtual network identified by the virtual network identifier.

Virtual routers 21 terminate virtual network overlay tunnels and determine virtual networks for received packets based on tunnel encapsulation headers for the packets, and forwards packets to the appropriate destination virtual network endpoints for the packets. For server 12A, for example, for each of the packets outbound from virtual network endpoints hosted by server 12A (e.g., VE 22A), the virtual router 21A attaches a tunnel encapsulation header indicating the virtual network for the packet to generate an encapsulated or "tunnel" packet, and virtual router 21A outputs the encapsulated packet via overlay tunnels for the virtual networks to a physical destination computing device, such as another one of servers 12. As used herein, a virtual router 21 may execute the operations of a tunnel endpoint to encapsulate inner packets sourced by virtual network endpoints to generate tunnel packets and decapsulate tunnel packets to obtain inner packets for routing to other virtual network endpoints. In the example of FIG. 1, virtual router 21 may be implemented in a kernel, a user space, as an SR-IOV virtual function, or as a smartNIC.

Computing infrastructure 8 implements an automation platform for automating deployment, scaling, and operations of virtual execution elements across servers 12 to provide virtualized infrastructure for executing application workloads and services. In some examples, the platform may be a container orchestration platform that provides a container-centric infrastructure for automating deployment, scaling, and operations of containers to provide a container-centric infrastructure. "Orchestration," in the context of a virtualized computing infrastructure generally refers to provisioning, scheduling, and managing virtual execution elements and/or applications and services executing on such virtual execution elements to the host servers available to the orchestration platform. Container orchestration, specifically, permits container coordination and refers to the deployment, management, scaling, and configuration, e.g., of containers to host servers by a container orchestration platform. Example instances of orchestration platforms include Kubernetes, Docker swarm, Mesos/Marathon, OpenShift, OpenStack, VMware, and Amazon ECS.

Elements of the automation platform of computing infrastructure 8 include at least servers 12, orchestrator 23, and network controller 24. Virtual execution elements may be deployed to a virtualization environment using a cluster-based framework in which a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily virtual execution element hosting devices of a cluster. For example, the Kubernetes platform uses the terms "cluster master" and "minion nodes," while the Docker Swarm platform refers to cluster managers and cluster nodes.

Orchestrator 23 and network controller 24 together implement a controller 5 for the computing infrastructure 8. Orchestrator 23 and network controller 24 may execute on separate computing devices or execute on the same computing device. Each of orchestrator 23 and network controller 24 may be a distributed application that executes on one or more computing devices. Orchestrator 23 and network controller 24 may implement respective master nodes for one or more clusters each having one or more minion nodes implemented by respective servers 12. In general, network controller 24 controls the network configuration of the data center 10 fabric to, e.g., establish one or more virtual networks for packetized communications among virtual network endpoints. Network controller 24 provides a logically and in some cases physically centralized controller for facilitating operation of one or more virtual networks within data center 10. In some examples, network controller 24 may operate in response to configuration input received from orchestrator 23 and/or an administrator/operator. Additional information regarding network controller 24 operating in conjunction with other devices of data center 10 or other software-defined network is found in International Application Number PCT/US2013/044378, filed Jun. 5, 2013, and entitled "PHYSICAL PATH DETERMINATION FOR VIRTUAL NETWORK PACKET FLOWS;" and in U.S. patent application Ser. No. 14/226,509, filed Mar. 26, 2014, and entitled "Tunneled Packet Aggregation for Virtual Networks," each which is incorporated by reference as if fully set forth herein. U.S. patent application Ser. No. 14/226,509 also includes further description of a virtual router, such as virtual router 21A.

In general, orchestrator 23 controls the deployment, scaling, and operations of virtual execution elements across clusters of servers 12 and providing computing infrastructure, which may include container-centric computing infrastructure. Orchestrator 23 and, in some cases, network controller 24 may implement respective cluster masters for one or more Kubernetes clusters. As an example, Kubernetes is a container management platform that provides portability across public and private clouds, each of which may provide virtualization infrastructure to the container management platform.

In accordance with the techniques described in this disclosure, virtual routers are configured to capture dropped packets and create modified dropped packets with drop information associated with the dropped packets to provide greater details of the dropped packets for further analysis and/or serviceability. In the illustrated example of FIG. 1, an administrator or user may use controller 5 to configure virtual router 21A to capture a packet to be dropped and create a modified dropped packet with drop information specifying details about the packet, and provide the modified dropped packet to an interface 28 (referred to herein as "drop interface 28") to communicate the modified dropped packet to a process executing in a user space of virtual router 21A to display and/or further analyze the modified dropped packet. For example, the administrator or user may use controller 5 to configure virtual router 21A to capture dropped packets and to provide modified dropped packets of all captured dropped packets, of dropped packets based on a particular drop type, and/or of dropped packets based on a particular drop type and originating from a particular host (e.g., one or more of VEs 22). Drop types may include fragmentation drops, interface drops, packet flow drops, network congestion drops, drops occurring from routing errors, etc. In some examples, the administrator or user may use controller 5 to further specify parameters to control when virtual router 21A is to provide the capturing and monitoring of dropped packets in accordance with the disclosed techniques. For example, the administrator or user may use controller 5 to specify that virtual router 21A is to provide the capturing and monitoring of dropped packets after detecting a specific number of dropped packets of a particular drop type.

Virtual router 21A may also be configured to, in response to determining a packet is to be dropped, create a modified dropped packet (e.g., by modifying the dropped packet or a copy of the dropped packet) to include information specifying details about the dropped packet. As one example, virtual router 21A may encapsulate information specifying details about the dropped packet, such as one or more attributes of the dropped packet (e.g., what, where, and when the drop occurred) and context specific information associated with the dropped packet (e.g., why the packet was dropped) to the modified dropped packet. The one or more attributes of the dropped packet may include information such as the drop type, where the drop occurred (e.g., location in software implementing the virtual router, interface receiving dropped packet, etc.), and/or when the drop occurred (e.g., timestamp). The context specific information associated with the dropped packet may indicate the cause of the determination of the packet to be dropped (e.g., routing information of the dropped packet, errors resulting from lookup of tables, etc.). The context specific information may vary depending on the drop type. As further described below, the dropped packet is specified in a payload of the modified dropped packet, the one or more attributes of the dropped packet is specified in a first portion of a header of the modified dropped packet, and the context specific information associated with the dropped packet is specified in a second portion of the header of the modified dropped packet.

Virtual router 21A is configured to provide the modified dropped packet to drop interface 28 to communicate the modified dropped packet via an internal communication channel to a process executed by virtual router 21A (or to an external packet analyzer tool). In some examples, the process is provided by server 12A (e.g., TCPDUMP process executed by a command line interface (CLI)) or is an external packet analyzer tool (e.g., Wireshark). In some examples, virtual router 21A may provide the modified dropped packet to controller 5 for additional serviceability (e.g., via a virtual router agent of server 12A).

Once configured to capture and modify dropped packets, virtual router 21A may receive a packet from an interface (e.g., virtual network interface 26A or NIC 13A) and determine that the packet is to be dropped (e.g., fragmentation drop due to the fragment table being full). In response, virtual router 21A creates a modified dropped packet (e.g., modifying the original packet or a copy of the original packet) and includes one or more attributes of the dropped packet and context specific information associated with the dropped packet. For example, virtual router 21A may encapsulate a header of the modified dropped packet including a first portion of the header specifying the attributes of the dropped packet and a second portion of the header specifying the context specific information associated with the dropped packet. Drop interface 28 may obtain the modified dropped packet including the one or more attributes and context specific information associated with the dropped packet, which in turn may communicate the modified dropped packet via an internal communication channel to a process of virtual router 21A or an external packet analyzer tool from which the administrator or user may perform further analysis on the modified dropped packet.

Figure 2:
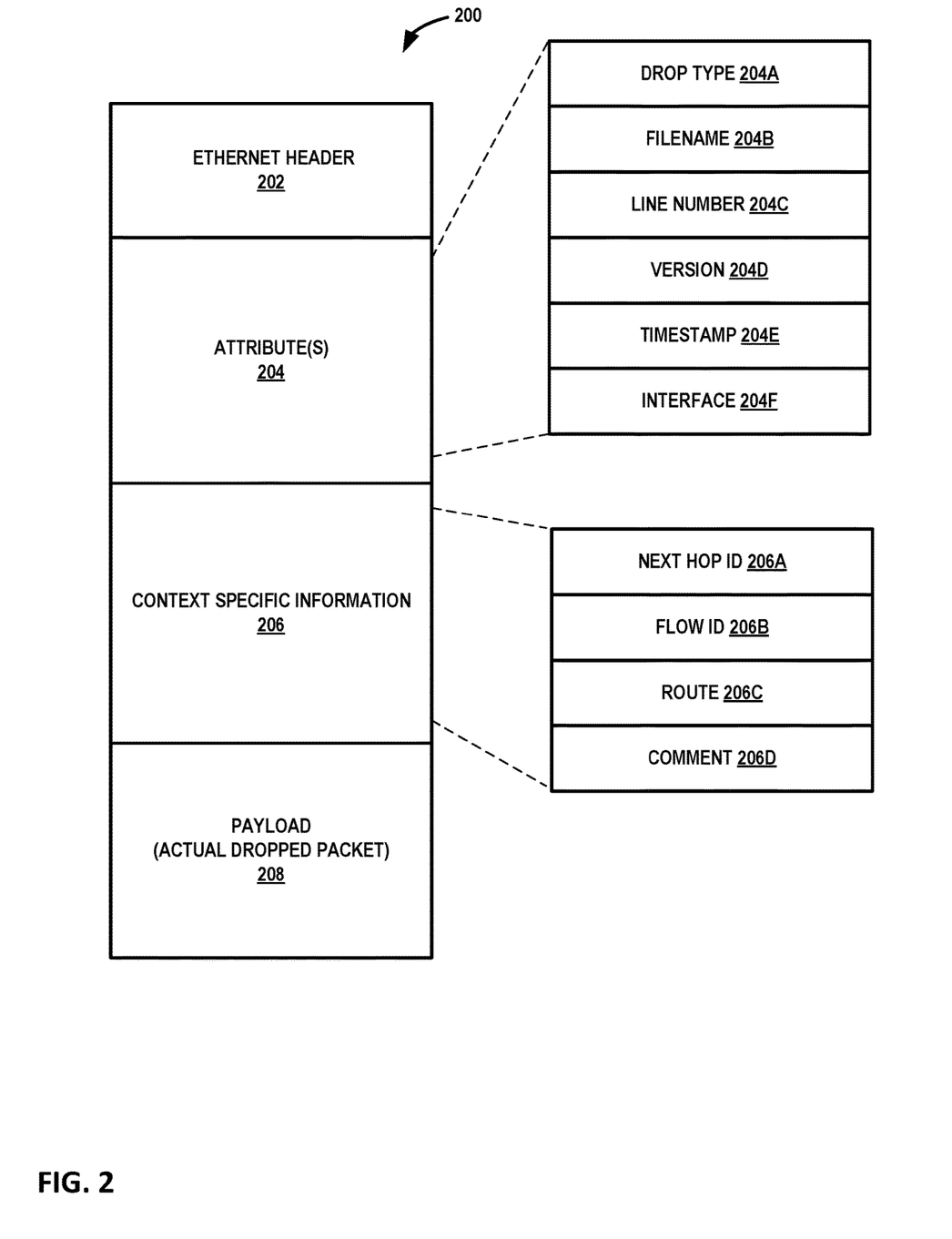
FIG. 2 is a block diagram illustrating an example packet format of a modified dropped packet including information specifying details about the dropped packet, in accordance with the techniques described in this disclosure.

FIG. 2 is a block diagram illustrating an example packet format of a modified dropped packet including information specifying details about the dropped packet, in accordance with the techniques described in this disclosure. Modified dropped packet 200 in the example of FIG. 2 may represent an example of the modified dropped packet generated by virtual router 21A as described in FIG. 1.

Modified dropped packet 200 includes a header including a first portion specifying one or more attributes 204 of the dropped packet. In this example, attributes 204 may include the drop type 204A, filename 204B, line number 204C, version 204D, timestamp 204E, and/or interface 204F. For example, drop type 204A may specify the type of drop, such as a fragmentation drop, interface drop, packet flow drop, network congestion drop, drop occurring from routing errors, etc. Attributes 204 may also include where the drop occurred. For example, server 12A may implement virtual router 21A with a software application. In this example, attributes of the dropped packet may include the filename 204B of the software application implementing virtual router 21A, line number 204C within the software application where the drop occurred, version 204D of the software application and/or the interface 204F (e.g., interface name) that captured the dropped packet. In some examples, attributes 204 of modified dropped packet 200 may include when the packet was dropped, such as timestamp 204E. The attributes 204 of modified dropped packet 200 is only one example and may include more or less information about what, where, and when the packet was dropped.

The header of modified dropped packet 200 includes a second portion specifying context specific information 206 describing why the packet was dropped. Context specific information 206 may vary depending on the type of dropped packet. As one example, if the drop type is a fragmentation drop, modified dropped packet 200 may include context specific information about the fragmentation drop, such as a next hop identifier 206A of the dropped packet, flow identifier 206B associated with the dropped packet, route 206C of the dropped packet (e.g., address resulting from a route lookup), and/or comments 206D about the reason for the fragmentation drop (e.g., fragment table full). Other drop types may include different context specific information that may be used to determine why the packet of a particular drop type was dropped. Although the header including the drop information (e.g., attributes 204 and context specific information 206) is described as portions of a header, the drop information may be specified in a plurality of headers.

Modified dropped packet 200 includes a payload 208 that specifies the dropped packet (e.g., the original dropped packet or copy of the dropped packet). In some examples, modified dropped packet 200 includes an Ethernet header 202 that specifies a placeholder Ethernet header to enable a process and/or packet analyzer tool to recognize the modified dropped packet. The format of modified dropped packet 200 is only one example and may alternatively be configured in any format that is supported by a particular packet analyzer tool.

Figure 3:
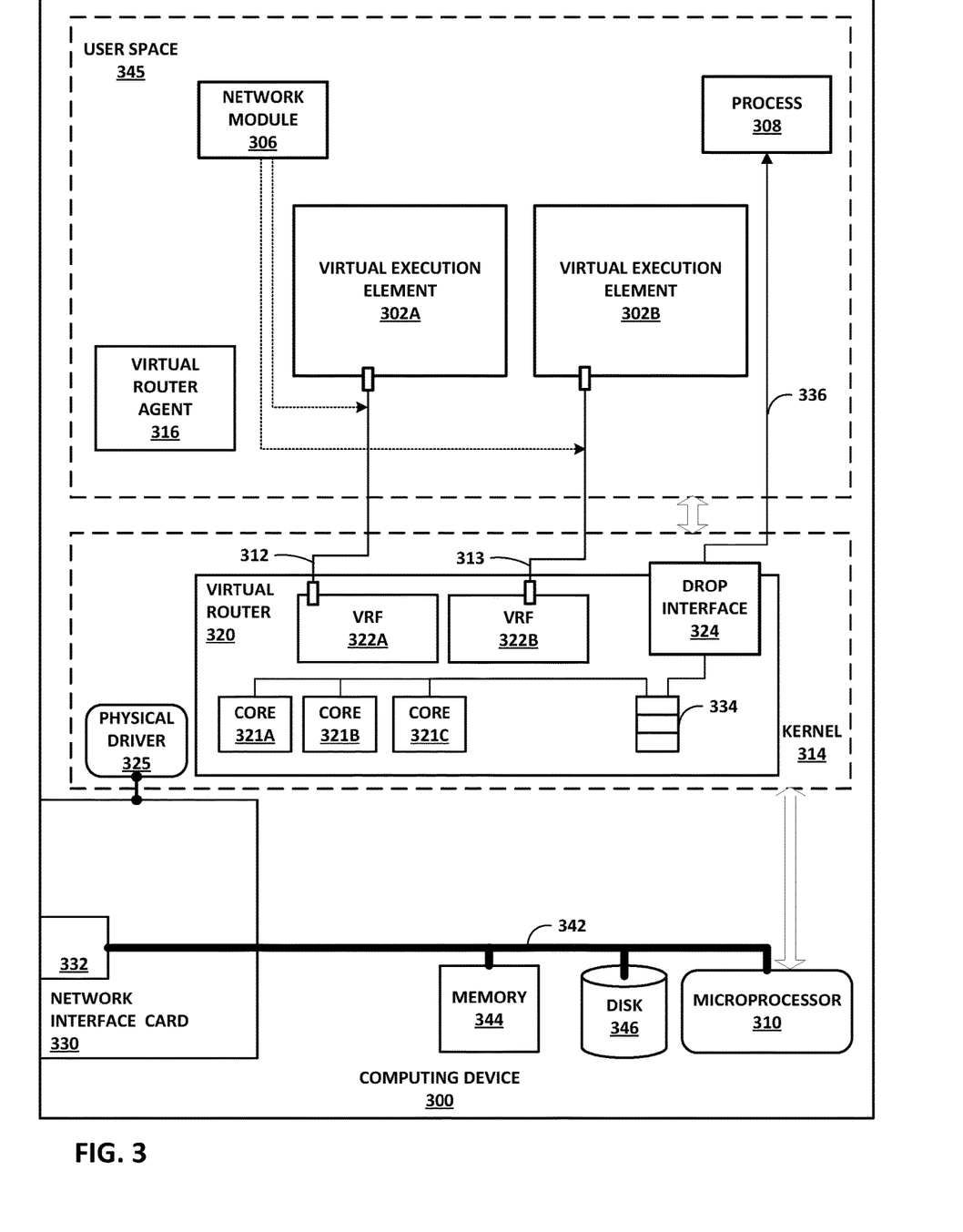
FIG. 3 is a block diagram of an example computing device that includes a virtual router configured to capture dropped packets and encapsulate the dropped packets with context specific data to provide greater details of the dropped packets for further analysis and/or serviceability, according to techniques described in this disclosure.

FIG. 3 is a block diagram of an example computing device that includes a virtual router configured to capture dropped packets and create modified dropped packets with drop information associated with the dropped packets to provide greater details of the dropped packets for further analysis and/or serviceability, according to techniques described in this disclosure. Computing device 300 of FIG. 3 may represent a real or virtual server and may represent an example instance of any of servers 12 of FIG. 1. Computing device 300 includes in this example, a bus 342 coupling hardware components of a computing device 300 hardware environment. Bus 342 couples network interface card (NIC) 330, storage disk 346, and one or more microprocessors 310 (hereinafter, "microprocessor 310"). NIC 330 may be SR-IOV-capable. A front-side bus may in some cases couple microprocessor 310 and memory device 344. In some examples, bus 342 may couple memory device 344, microprocessor 310, and NIC 330. Bus 342 may represent a Peripheral Component Interface (PCI) express (PCIe) bus. In some examples, a direct memory access (DMA) controller may control DMA transfers among components coupled to bus 342. In some examples, components coupled to bus 342 control DMA transfers among components coupled to bus 342.

Microprocessor 310 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 346 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 310.

Main memory 344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 344 provides a physical address space composed of addressable memory locations.

Network interface card (NIC) 330 includes one or more physical interfaces 332 configured to exchange packets using links of an underlying physical network. Interfaces 332 may include a port interface card having one or more network ports. NIC 330 may also include an on-card memory to, e.g., store packet data. Direct memory access transfers between the NIC 330 and other devices coupled to bus 342 may read/write from/to the NIC memory.

Memory 344, NIC 330, storage disk 346, and microprocessor 310 may provide an operating environment for a software stack that includes an operating system kernel 314 executing in kernel space. The kernel may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes a kernel provides an execution environment for one or more processes in user space 345.

Kernel 314 includes a physical driver 325 to use the network interface card 330. Network interface card 330 may also implement SR-IOV to enable sharing the physical network function (I/O) among one or more virtual execution elements, e.g., virtual execution elements 302A-302B (collectively, "virtual execution elements 302"), such as one or more virtual machines or containers. Shared virtual devices such as virtual functions may provide dedicated resources such that each of the virtual execution elements 302 may access dedicated resources of NIC 330, which therefore appears to each of the virtual execution elements 302 as a dedicated NIC. Virtual functions may represent lightweight PCIe functions that share physical resources with a physical function used by physical driver 325 and with other virtual functions. For an SR-IOV-capable NIC 330, NIC 330 may have thousands of available virtual functions according to the SR-IOV standard, but for I/O-intensive applications the number of configured virtual functions is typically much smaller.

Computing device 300 may be coupled to a physical network switch fabric that includes an overlay network that extends switch fabric from physical switches to software or "virtual" routers of physical servers coupled to the switch fabric, including virtual router 320. Virtual routers may be processes or threads, or a component thereof, executed by the physical servers, e.g., servers 12 of FIG. 1, that dynamically create and manage one or more virtual networks usable for communication between virtual network endpoints. In one example, virtual routers implement each virtual network using an overlay network, which provides the capability to decouple an endpoint's virtual address from a physical address (e.g., IP address) of the server on which the endpoint is executing. Each virtual network may use its own addressing and security scheme and may be viewed as orthogonal from the physical network and its addressing scheme. Various techniques may be used to transport packets within and across virtual networks over the physical network. The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12.

In the example illustrated in FIG. 3, virtual router 320 can be executing as a kernel module. In some examples, the virtual router may be executing as a user space Data Plane Development Kit (DPDK) process (not shown). Additional examples of a virtual router executed as a user space DPDK process is described in Indian Provisional Patent Application No. 202141008464, filed Mar. 1, 2021, the entire contents of which is incorporated by reference herein.

Virtual router agent 316 has a connection to network controller 24 using a channel, which is used to download configurations and forwarding information. Virtual router agent 316 programs this forwarding state to the virtual router data (or "forwarding") plane represented by virtual router 320. Virtual router agent 316 may be executing as a user space process.

Virtual router 320 may replace and subsume the virtual routing/bridging functionality of the Linux bridge/OVS module that is commonly used for Kubernetes deployments of pods. Virtual router 320 may perform bridging (e.g., E-VPN) and routing (e.g., L3VPN, IP-VPNs) for virtual networks. Virtual router 320 may perform networking services such as applying security policies, NAT, multicast, mirroring, and load balancing.

Virtual router 320 may be multi-threaded and execute on one or more processor cores, e.g., forwarding cores 321A-321C (collectively, "forwarding cores 321"). Forwarding cores 321 of virtual router 320 may implement a packet processing pipeline. The pipeline can be stitched by the virtual router agent 316 from the simplest to the most complicated manner depending on the operations to be applied to a packet. Virtual router 320 may maintain multiple instances of forwarding information. Virtual router 300 may access and update tables using RCU (Read Copy Update) locks. Virtual router 320 may include multiple queues, e.g., queues 334, mapped to the forwarding cores 321 that are used when processing packets within the processing pipeline.

To send packets to other compute nodes or switches, virtual router 320 uses one or more physical interfaces 332. In general, virtual router 320 exchanges overlay packets with workloads provided by virtual execution elements (e.g., VMs or pods). Virtual router 320 has multiple virtual network interfaces (e.g., vifs). These interfaces may include the kernel interface, vhost0, for exchanging packets with the host operating system; an interface with virtual router agent 316, pkt0, to obtain forwarding state from the network controller and to send up exception packets. There may be one or more virtual network interfaces corresponding to the one or more physical network interfaces 332.

Other virtual network interfaces of virtual router 320 are for exchanging packets with the workloads. Virtual network interfaces 312, 313 of virtual router 320 are illustrated in FIG. 3. Virtual network interfaces 312, 313 may be any of the aforementioned types of virtual interfaces. In some cases, virtual network interfaces 312, 313 are tap interfaces to enable a tap device (e.g., virtual router 320) to forward packets to the user space 345.

In a kernel-based deployment of virtual router 320, virtual router 320 is installed as a kernel module inside the operating system. Virtual router 320 registers itself with the TCP/IP stack to receive packets from any of the desired operating system interfaces that it wants. The interfaces can be bond, physical, tap (for VMs), veth (for containers) etc. Virtual router 320 in this mode relies on the operating system to send and receive packets from different interfaces. For example, the operating system may expose a tap interface backed by a vhost-net driver to communicate with VMs, such as virtual execution elements 302. Once virtual router 320 registers for packets from this tap interface, the TCP/IP stack sends all the packets to it. Virtual router 320 sends packets via an operating system interface. In addition, NIC queues (physical or virtual) are handled by the operating system.

In a DPDK-based deployment of virtual router 320 (not shown), virtual router 320 is installed as a user space 345 application that is linked to the DPDK library. This may lead to faster performance than a kernel-based deployment, particularly in the presence of high packet rates. The physical interfaces 332 are used by the poll mode drivers (PMDs) of DPDK rather the kernel's interrupt-based drivers. The registers of physical interfaces 332 may be exposed into user space 345 in order to be accessible to the PMDs; a physical interface 332 bound in this way is no longer managed by or visible to the host operating system, and the DPDK-based virtual router manages the physical interface 332. This includes packet polling, packet processing, and packet forwarding. In other words, user packet processing steps are performed by the virtual router DPDK data plane. The nature of this "polling mode" makes the virtual router DPDK data plane packet processing/forwarding much more efficient as compared to the interrupt mode of a kernel-based deployment of virtual router 320 when the packet rate is high. There are comparatively few interrupts and context switching during packet I/O, compared to kernel-mode virtual router 320, and interrupt and context switching during packet I/O may in some cases be avoided altogether.

Computing device 300 includes a virtual router agent 316 that controls the overlay of virtual networks for computing device 300 and that coordinates the routing of data packets within computing device 300. In general, virtual router agent 316 communicates with network controller 24 for the virtualization infrastructure, which generates commands to create virtual networks and configure network virtualization endpoints, such as computing device 300 and, more specifically, virtual router 320, as a well as virtual network interfaces such as virtual network interfaces 312 and 313. By configuring virtual router 320 based on information received from network controller 24, virtual router agent 316 may support configuring network isolation, policy-based security, a gateway, source network address translation (SNAT), a load-balancer, and service chaining capability for orchestration.

In one example, network packets, e.g., layer three (L3) IP packets or layer two (L2) Ethernet packets generated or consumed by the virtual execution elements 302A-302B within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed by virtual router 320. This functionality is referred to herein as tunneling and may be used to create one or more overlay networks. Besides IPinIP, other example tunneling protocols that may be used include IP over Generic Route Encapsulation (GRE), VxLAN, Multiprotocol Label Switching (MPLS) over GRE, MPLS over User Datagram Protocol (UDP), etc. Virtual router 320 performs tunnel encapsulation/decapsulation for packets sourced by/destined to any of virtual execution elements 302, and virtual router 320 exchanges packets with virtual execution elements 302 via bus 342 and/or a bridge of NIC 330.

As noted above, a network controller 24 may provide a logically centralized controller for facilitating operation of one or more virtual networks. The network controller 24 may, for example, maintain a routing information base, e.g., one or more routing tables that store routing information for the physical network as well as one or more overlay networks. Virtual router 320 implements one or more virtual routing and forwarding instances (VRFs) 322A-322B for respective virtual networks for which virtual router 320 operates as respective tunnel endpoints. In general, each VRF 322 stores forwarding information for the corresponding virtual network and identifies where data packets are to be forwarded and whether the packets are to be encapsulated in a tunneling protocol, such as with a tunnel header that may include one or more headers for different layers of the virtual network protocol stack. Each of VRFs 322 may include a network forwarding table storing routing and forwarding information for the virtual network.

NIC 330 may receive tunnel packets. Virtual router 320 processes the tunnel packet to determine, from the tunnel encapsulation header, the virtual network of the source and destination endpoints for the inner packet. Virtual router 320 may strip the layer 2 header and the tunnel encapsulation header to internally forward only the inner packet. The tunnel encapsulation header may include a virtual network identifier, such as a VxLAN tag or MPLS label, that indicates a virtual network, e.g., a virtual network corresponding to VRF 322A. VRF 322A may include forwarding information for the inner packet. For instance, VRF 322A may map a destination layer 3 address for the inner packet to virtual network interface 312. VRF 322A forwards the inner packet via virtual network interface 312 to virtual execution element 302A in response.

Virtual execution elements 302A-302B may also source inner packets as source virtual network endpoints. Virtual execution element 302A, for instance, may generate a layer 3 inner packet destined for a destination virtual network endpoint that is executed by another computing device (i.e., not computing device 300) or for another one of virtual execution elements (e.g., virtual execution element 302B). Virtual execution element 302A sends the layer 3 inner packet to virtual router 320 via virtual network interface 312 attached to VRF 322A.

Virtual router 320 receives the inner packet and layer 2 header and determines a virtual network for the inner packet. Virtual router 320 may determine the virtual network using any of the above-described virtual network interface implementation techniques (e.g., macvlan, tap, veth, etc.). Virtual router 320 uses the VRF 322A corresponding to the virtual network for the inner packet to generate an outer header for the inner packet, the outer header including an outer IP header for the overlay tunnel and a tunnel encapsulation header identifying the virtual network. Virtual router 320 encapsulates the inner packet with the outer header. Virtual router 320 may encapsulate the tunnel packet with a new layer 2 header having a destination layer 2 address associated with a device external to the computing device 300, e.g., a TOR switch 16 or one of servers 12. If external to computing device 300, virtual router 320 outputs the tunnel packet with the new layer 2 header to NIC 330. NIC 330 outputs the packet on an outbound interface. If the destination is another virtual network endpoint executing on computing device 300, virtual router 320 routes the packet to the appropriate one of virtual network interfaces 312, 313.

In some examples, a controller for computing device 300 (e.g., network controller 24 of FIG. 1) configures a default route in each of virtual execution elements 302 to cause the virtual execution elements 302 to use virtual router 320 as an initial next hop for outbound packets. In some examples, NIC 330 is configured with one or more forwarding rules to cause all packets received from virtual execution elements 302 to be switched to virtual router 320.

Network module 306 may obtain interface configuration data for configuring virtual network interfaces for virtual execution elements 302. Virtual router agent 316 operates as a virtual network control plane module for enabling network controller 24 to configure virtual router 320. A virtual network control plane (including network controller 24 and virtual router agent 316 for minion nodes) manages the configuration of virtual networks implemented in the data plane in part by virtual routers 320 of the minion nodes. Virtual router agent 316 communicates, to network module 306, interface configuration data for virtual network interfaces to enable an orchestration control plane element (i.e., network module 306) to configure the virtual network interfaces according to the configuration state determined by the network controller 24, thus bridging the gap between the orchestration control plane and virtual network control plane. In addition, this may enable a network module 306 to obtain interface configuration data for multiple virtual network interfaces for a virtual execution element and configure the multiple virtual network interfaces, which may reduce communication and resource overhead inherent with invoking a separate network module 306 for configuring each virtual network interface.

In accordance with the techniques described in this disclosure, virtual router 320 is configured to capture dropped packets and create modified dropped packets with drop information associated with the dropped packets to provide greater details of the dropped packets for further analysis and/or serviceability.

In the illustrated example of FIG. 3, virtual router agent 316 may receive interface configuration data (e.g., via a command line interface (CLI) or other interface, or through virtual router agent 316 received from a controller) to configure drop interface 324 of virtual router 320 to capture dropped packets and create modified dropped packets with drop information associated with the dropped packets. In some examples, an administrator or user may configure drop interface 324 to capture all dropped packets. For instance, the administrator or user may use controller 5 to input the command dropcap-i vif0/3, to cause virtual router 320 to capture dropped packets, create modified dropped packets for all dropped packets, and provide the modified dropped packets to drop interface 324 (vif0/3). In some examples, the administrator or user may further configure drop interface 324 to capture dropped packets of a particular drop type. For instance, the administrator or user may use controller 5 to input the command dropcap-i vif0/3-t VP_DROP_FLOW_NO_MEMORY, to cause virtual router 320 capture dropped packets, create modified dropped packets of packets of a flow dropped due to no memory (VP_DROP_FLOW_NO_MEMORY), and provide the modified dropped packets to drop interface 324. In some examples, the administrator or user may further configure drop interface 324 to capture dropped packets of a particular drop type and/or originating from a particular host. For instance, the administrator or user may use controller 5 to input the command dropcap-i vif0/3-t VP_DROP_FLOW_NO_MEMORY host 10.10.10.1, to cause virtual router 320 to capture dropped packets, create modified dropped packets of packets of a flow dropped due to no memory (VP_DROP_FLOW_NO_MEMORY) and originated from the host device with an address of 10.10.10.1, and provide the modified dropped packets to drop interface 324. In some examples, administrator or user may configure drop interface 324 to capture only dropped packets of a particular drop type, only dropped packets originating from a particular host device, dropped packets of the particular drop type and originating from a particular host, or any combination of drop parameters.

Computing device 300 may include an internal communication channel 366, e.g., a Linux socket, to enable drop interface 324 to communicate modified dropped packets via internal communication channel 366 to one or more processes, such as process 308 (e.g., TCPDUMP), executed within user space 345 or external to computing device 300 (e.g., packet analyzer tool).

Once drop interface 324 is configured, any of forwarding cores 321 (e.g., forwarding core 321A) may receive a packet and process the packet within its packet processing pipeline. The forwarding core may capture packets being processed within the packet processing pipeline that are determined to be dropped and provide modified dropped packets to drop interface 324 in accordance with the interface configuration data used to configure drop interface 324 (e.g., all dropped packets, by drop type, from a particular originating host). For example, virtual router 320 may receive a packet from an interface (e.g., NIC 330 or one of virtual network interfaces 312, 313), and forwarding core 321A processes the packet according to the packet processing pipeline. Forwarding core 321A may determine the packet is to be dropped at any point in the packet processing pipeline, e.g., due to a packet processing error occurring within the packet processing pipeline (e.g., fragmentation drops, interface drops, packet flow drops, network congestion drops, drops occurring from errors resulting from a lookup of tables, etc.).

In response to determining that the packet is to be dropped, forwarding core 321A may, instead of dropping the packet, create a modified dropped packet (e.g., from the original dropped packet or a copy of the dropped packet) with one or more attributes (e.g., attribute(s) 204 of FIG. 2) and context specific information (e.g., context specific information 206 of FIG. 2) of the dropped packet. In this example, forwarding core 321A may encapsulate a header of the modified dropped packet including a first portion of the header specifying attributes such as the drop type, filename of the software application implementing virtual router 320, the line number within the source application where the dropped occurred, the version of the software application, a timestamp of when the dropped occurred, and/or an interface name. The header of the modified dropped packet also includes a second portion specifying context specific information associated with the dropped packet that indicates why the packet is to be dropped (e.g., information describing a cause of a packet processing error occurring within the packet processing pipeline, etc.). Context specific information encapsulated by forwarding core 321A may vary depending on the type of dropped packet. As one example, forwarding core 321A of virtual router 320 may receive a packet from virtual network interface 312 and determine that the packet is to be dropped due to a fragmentation drop (that is to be captured by drop interface 324). In this example, forwarding core 321A may create a modified dropped packet including one or more attributes specifying at least a virtual network interface attribute that indicates the virtual network interface on which the packet was received (e.g., vif), and other attributes such as the drop type (fragmentation drop), filename of the software application implementing virtual router 320, the line number within the source application where the dropped occurred, the version of the software application, and a timestamp of when the dropped occurred. Forwarding core 321A may further include context specific information within the modified dropped packet to specify information such as the next hop identifier, flow identifier, route, and/or a comment indicating the drop was due to the fragmentation table being full.

Forwarding core 321A may enqueue the modified dropped packet to at least one of queues 334 of virtual router 320, which is a queue associated with drop interface 324. One of forwarding cores 321 (e.g., forwarding core 321C), which may operate as a service core for sending and receiving packets from different interfaces of virtual router 320, may use an interrupt-based driver in the case of a kernel-based virtual router 320 or a tap driver in the case of a virtual router 320 installed as a user space 345 application to send the modified dropped packet in queues 334 to drop interface 324 to communicate the modified dropped packet via the internal communication channel 366 to process 308 executed within user space 345 or to a process executed by a device external to computing device 300. Other forwarding cores 321 may similarly capture dropped packets, create corresponding modified dropped packets, and enqueue the modified dropped packets to at least one of queues 334 of virtual router 320 from which the service core may send the modified dropped packets to drop interface 324 to communicate the modified dropped packets to one or more processes.

In some examples, an administrator or user may use a command line interface (CLI) of computing device 300 to display the modified dropped packet for further analysis. For example, the administrator or user may use process 308, such as a TCPDUMP process executed by the CLI, to obtain the modified dropped packet from drop interface 324 and to display the one or more attributes and context specific information of the modified dropped packet via the display. In some examples, the administrator or user may use a process executed by an external device, such as a packet analyzer tool external to computing device 300 (e.g., Wireshark), that may obtain the modified dropped packet from drop interface 324 and display the modified dropped packet. In some examples, process 308 may represent a process executed within user space 345 that causes virtual router agent 316 to obtain the modified dropped packet from drop interface 324 and to provide the modified dropped packet to a controller (e.g., controller 5 of FIG. 1) for additional serviceability and/or processing.

Figure 4:
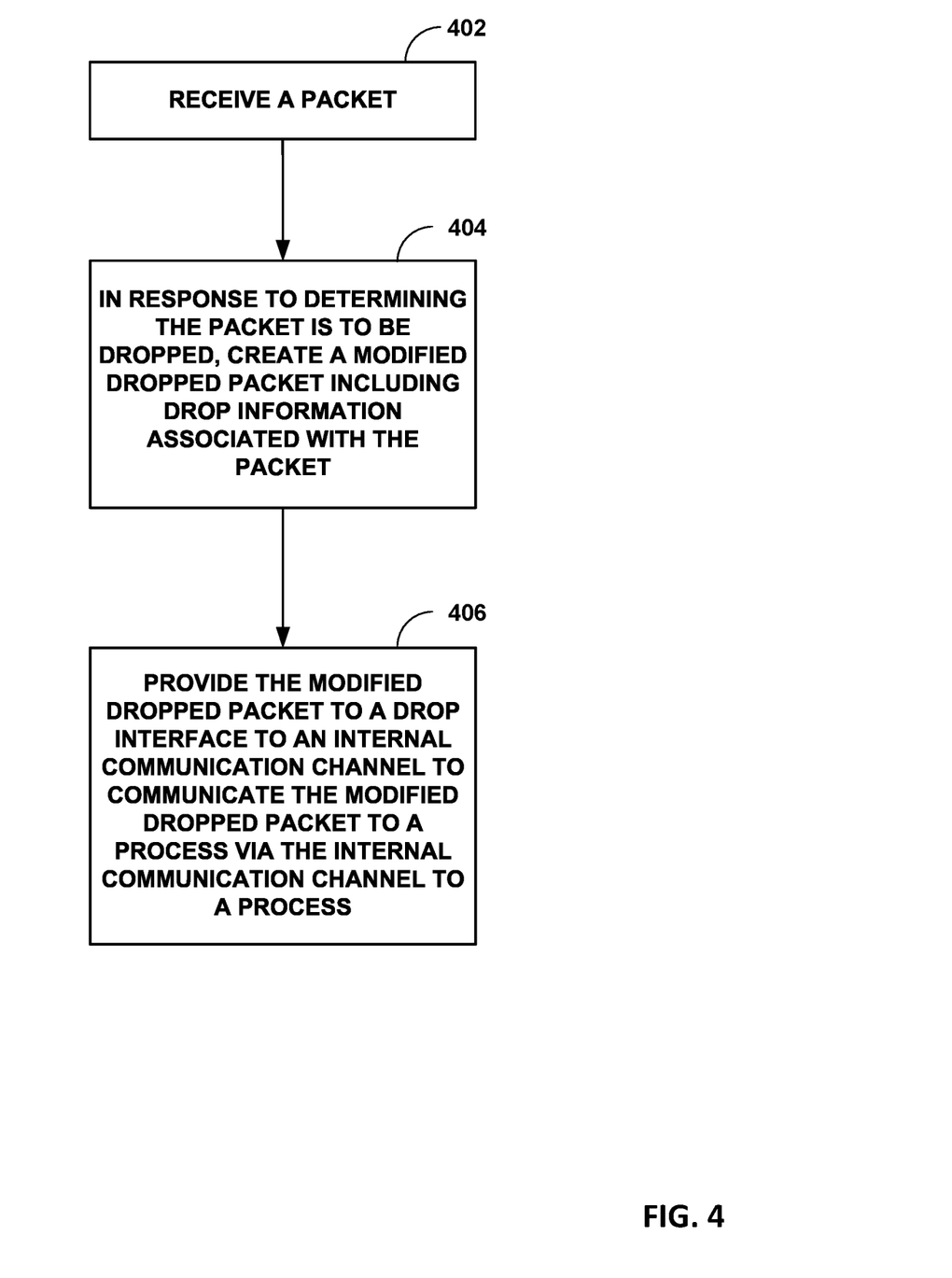
FIG. 4 is a flow diagram illustrating an example operation of a virtual router for capturing dropped packets and encapsulating the dropped packets with context specific data to provide greater details of the dropped packets for further analysis and/or serviceability, in accordance with techniques described in this disclosure.

FIG. 4 is a flow diagram illustrating an example operation of a virtual router for capturing dropped packets and modifying the dropped packets with context specific information to provide greater details of the dropped packets for further analysis and/or serviceability, in accordance with techniques described in this disclosure. For purposes of example, the operations are described with respect to server 12A of FIG. 1 and components of server 12A, such as the components in computing device 300 of FIG. 3.

In the example of FIG. 4, a computing device 300 is includes a virtual router 320 configured with a drop interface 324 to an internal communication channel 336 to communicate modified dropped packets to process 308. In some examples, virtual router 320 may receive a packet (402) and determines that the packet is to be dropped. For example, virtual router 320 may receive a packet from an interface (e.g., NIC 330 or one of virtual network interfaces 312, 313), and forwarding core 321A processes the packet according to the packet processing pipeline. Virtual router 320 may determine the packet is to be dropped at any point in the packet processing pipeline, e.g., due to a packet processing error occurring within the packet processing pipeline (e.g., fragmentation drops, interface drops, packet flow drops, network congestion drops, drops occurring from errors resulting from a lookup of tables, etc.).

In response to determining that the packet is to be dropped, virtual router 320 may, instead of dropping the packet, create a modified dropped packet (e.g., by modifying the packet or modifying a copy of the packet) with drop information associated with the packet (404). For example, forwarding core 321A may create the modified dropped packet by including the modified dropped packet with one or more attributes (e.g., attribute(s) 204 of FIG. 2) of the dropped packet and context specific information (e.g., context specific information 206 of FIG. 2) associated with the dropped packet. As one example, virtual router 320 may specify the dropped packet (original or a copy of the dropped packet) in a payload of the modified dropped packet and encapsulate a header of the modified dropped packet with a first portion of the header specifying the one or more attributes and a second portion of the header specifying the context specific information associated with the dropped packet.

Virtual router 320 provides the modified dropped packet to drop interface 324 to the internal communication channel to communicate the modified dropped packet via the internal communication channel to process 308 (406). For example, forwarding core 321A may enqueue the modified dropped packet to at least one of queues 334 of virtual router 320, which is a queue associated with drop interface 324. Other forwarding cores, e.g., forwarding core 321B, may also provide corresponding modified dropped packets to drop interface 324 to communicate the corresponding modified dropped packets via the internal communication channel to process 308. One of forwarding cores 321 (e.g., forwarding core 321C), which may operate as a service core for sending and receiving packets from different interfaces of virtual router 320, may use an interrupt-based driver in the case of a kernel-based virtual router 320 or a tap driver in the case of a virtual router 320 installed as a user space 345 application to send the modified dropped packets in queues 334 to drop interface 324 to communicate the modified dropped packets via internal communication channel 336 to process 308 (e.g., TCPDUMP of a CLI provided by computing device 300 or an external packet analyzer tool) from which an administrator or user may use to display the modified dropped packet for further analysis.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A computing device comprising:
an internal communication channel; and
processing circuitry configured to execute a virtual router, wherein the virtual router is configured to:
receive a packet;
in response to determining the packet is to be dropped, create a modified dropped packet that includes drop information associated with the packet by:
encapsulating the drop information as a header of the modified dropped packet, wherein the drop information includes at least context specific information associated with a cause of the determination of the packet to be dropped; and
specifying the packet or a copy of the packet as a payload of the modified dropped packet; and
provide the modified dropped packet to a drop interface to the internal communication channel to communicate the modified dropped packet via the internal communication channel to a process executed in user space of the computing device.

2. The computing device of claim 1, wherein the drop information further comprises:
one or more attributes associated with the packet to be dropped.

3. The computing device of claim 2, wherein the one or more attributes comprises one or more of a drop type, a filename of a software application implementing the virtual router, a line number indicating an instruction executing when the determination to drop the packet occurred, a version of the software application, a timestamp, or a virtual network interface of the virtual router.

4. The computing device of claim 3, wherein the one or more attributes comprising the virtual network interface of the virtual router comprises:
a virtual network identifier in the modified dropped packet that indicates a virtual network on which the packet was received.

5. The computing device of claim 1, wherein the context specific information comprises information describing a cause of a packet processing error occurring within a packet processing pipeline of the virtual router.

6. The computing device of claim 1, wherein to provide the modified dropped packet to the drop interface, the virtual router is configured to:
send, by a forwarding core of a plurality of logical cores of the virtual router, the modified dropped packet to a queue associated with the drop interface;
obtain, by a service core of the plurality of logical cores, the modified dropped packet from the queue; and
send, by the service core, the modified drop packet to the drop interface.

7. The computing device of claim 6,
wherein the queue associated with the drop interface includes modified dropped packets from other forwarding cores of the plurality of logical cores, and
wherein the virtual router is further configured to:
obtain, by the service core, modified dropped packets from other forwarding cores of the plurality of logical cores from the queue; and
sending, by the service core, the modified dropped packets from other forwarding cores of the plurality of logical cores to the drop interface.

8. The computing device of claim 1, wherein the processing circuitry is configured to execute the virtual router as a kernel module of the computing device.

9. The computing device of claim 1, wherein the processing circuitry is configured to execute the virtual router as a user space Data Plane Development Kit (DPDK) process.

10. The computing device of claim 1, wherein to create the modified dropped packet that includes the drop information associated with the packet, the virtual router is configured to:
generate a copy of the packet; and
modify the copy of the packet that includes the drop information associated with the packet.

11. The computing device of claim 1, wherein to create the modified dropped packet, the virtual router is configured to:
modify the packet that includes the drop information associated with the packet.

12. The computing device of claim 1, wherein the virtual router is configured to create the modified dropped packet based on a particular drop type.

13. The computing device of claim 8, wherein the virtual router is configured to create the modified dropped packet based on the packet originating from a particular host.

14. The computing device of claim 1, wherein the virtual router is configured to create the modified dropped packet based on a particular drop type and the packet originating from a particular host.

15. A method comprising:
receiving, by a virtual router of a computing device, a packet;
in response to determining the packet is to be dropped, creating a modified dropped packet that includes drop information associated with the packet by:
encapsulating the drop information as a header of the modified dropped packet, wherein the drop information includes at least context specific information associated with a cause of the determination of the packet to be dropped, and specifying the packet or a copy of the packet as a payload of the modified dropped packet; and providing, by the virtual router, the modified dropped packet to a drop interface of the virtual router to an internal communication channel of the computing device to communicate the modified dropped packet via the internal communication channel to a process executed in user space of the computing device.

16. The method of claim 15, wherein encapsulating the drop information as the header of the modified dropped packet comprises:

encapsulating a first portion of the header to include one or more attributes associated with the packet to be dropped; and encapsulating a second portion of the header to include the context specific information associated with the packet to be dropped.

17. The method of claim 15, wherein providing the modified dropped packet to the drop interface of the virtual router comprises:

sending, by a forwarding core of a plurality of logical cores of the virtual router, the modified dropped packet to a queue associated with the drop interface;

obtaining, by a service core of the plurality of logical cores, the modified dropped packet from the queue; and sending, by the service core, the modified drop packet to the drop interface.

18. Non-transitory computer-readable storage media encoded with instructions that, when executed, cause one or more processors of a computing device to:

receive a packet;

in response to determining the packet is to be dropped, create a modified dropped packet that includes drop information associated with the packet by:

encapsulating the drop information as a header of the modified dropped packet, wherein the drop information includes at least context specific information associated with a cause of the determination of the packet to be dropped, and specifying the packet or a copy of the packet as a payload of the modified dropped packet; and provide the modified dropped packet to a drop interface of a virtual router to an internal communication channel of the computing device to communicate the modified dropped packet to a process executed in a user space of the computing device.

\* \* \* \* \*